April 20, 1943. I. J. SNADER 2,316,816
SCREW THREAD GRINDING MACHINE
Filed Oct. 30, 1940 11 Sheets-Sheet 1
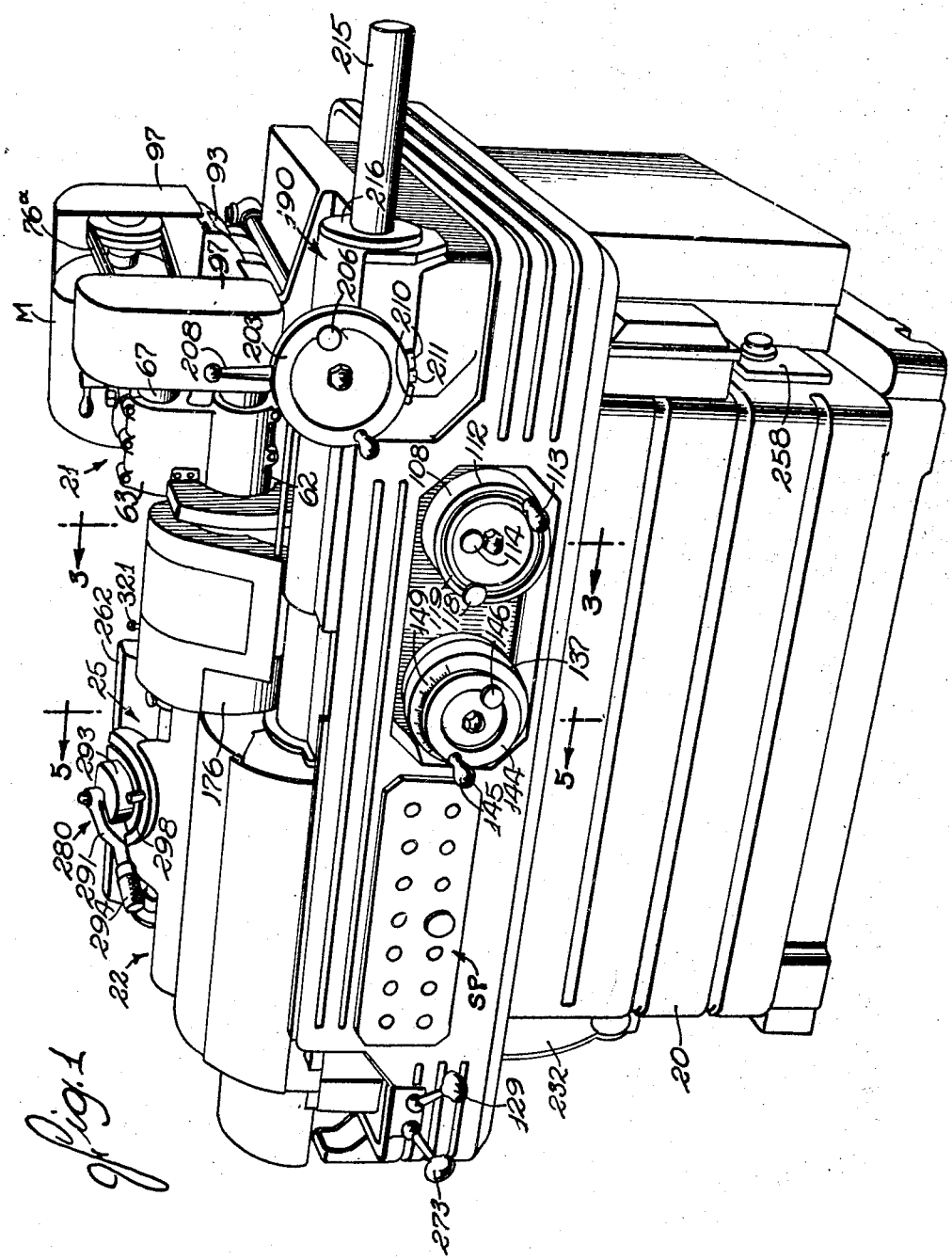
INVENTOR
Ira J. Snader
By Parker, Carlson, Pitzner & Hubbard
ATTORNEYS

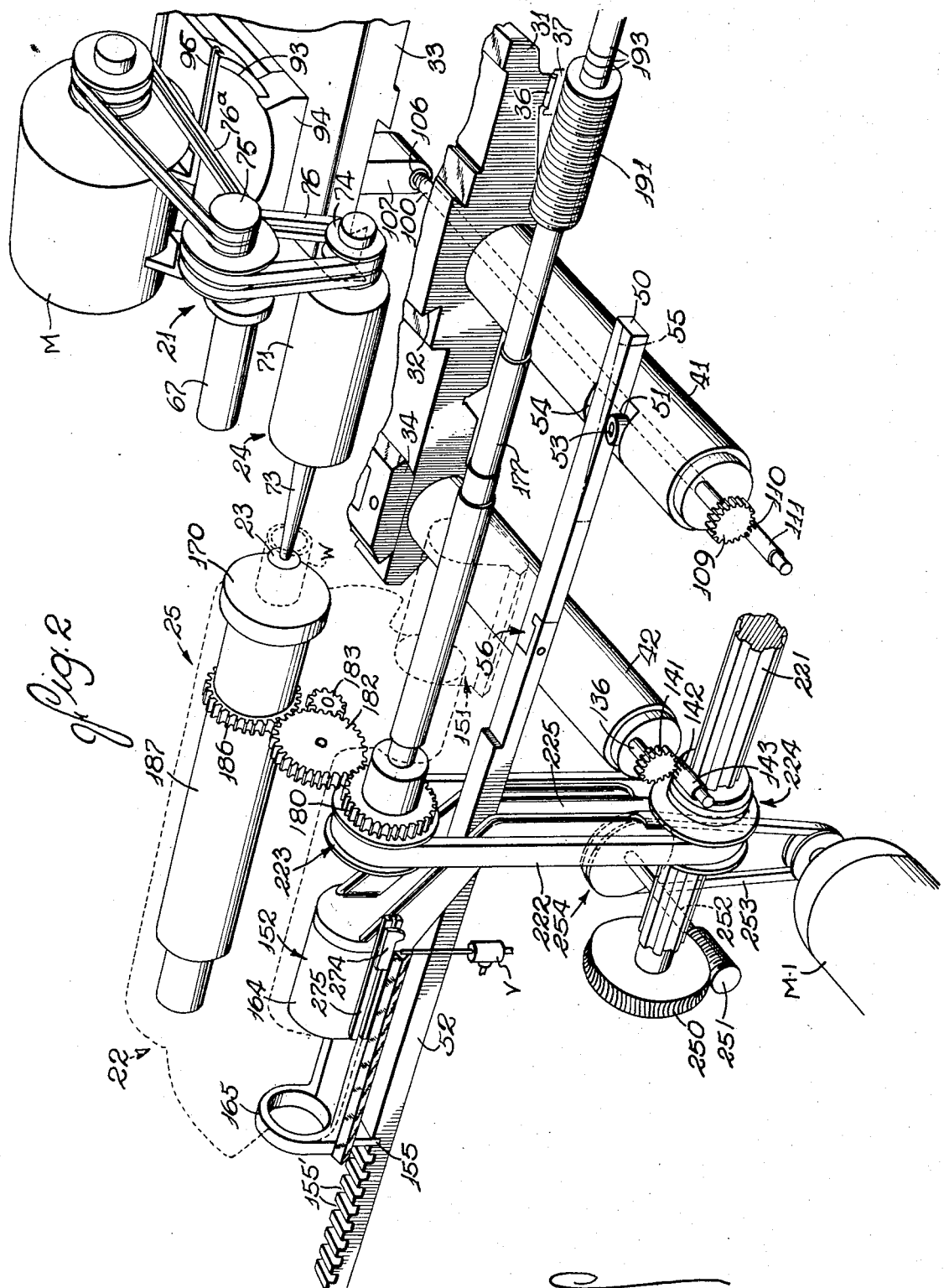

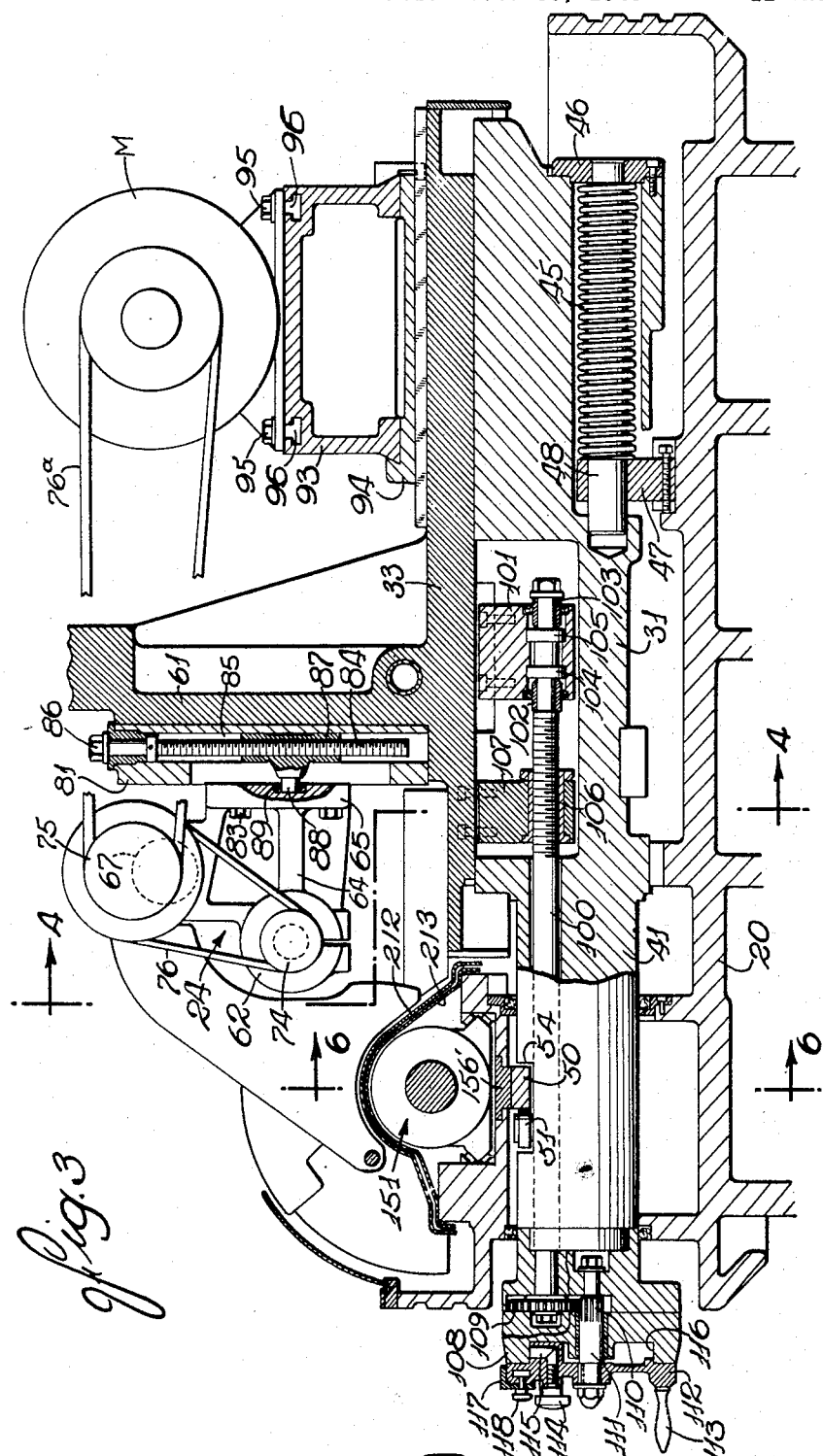

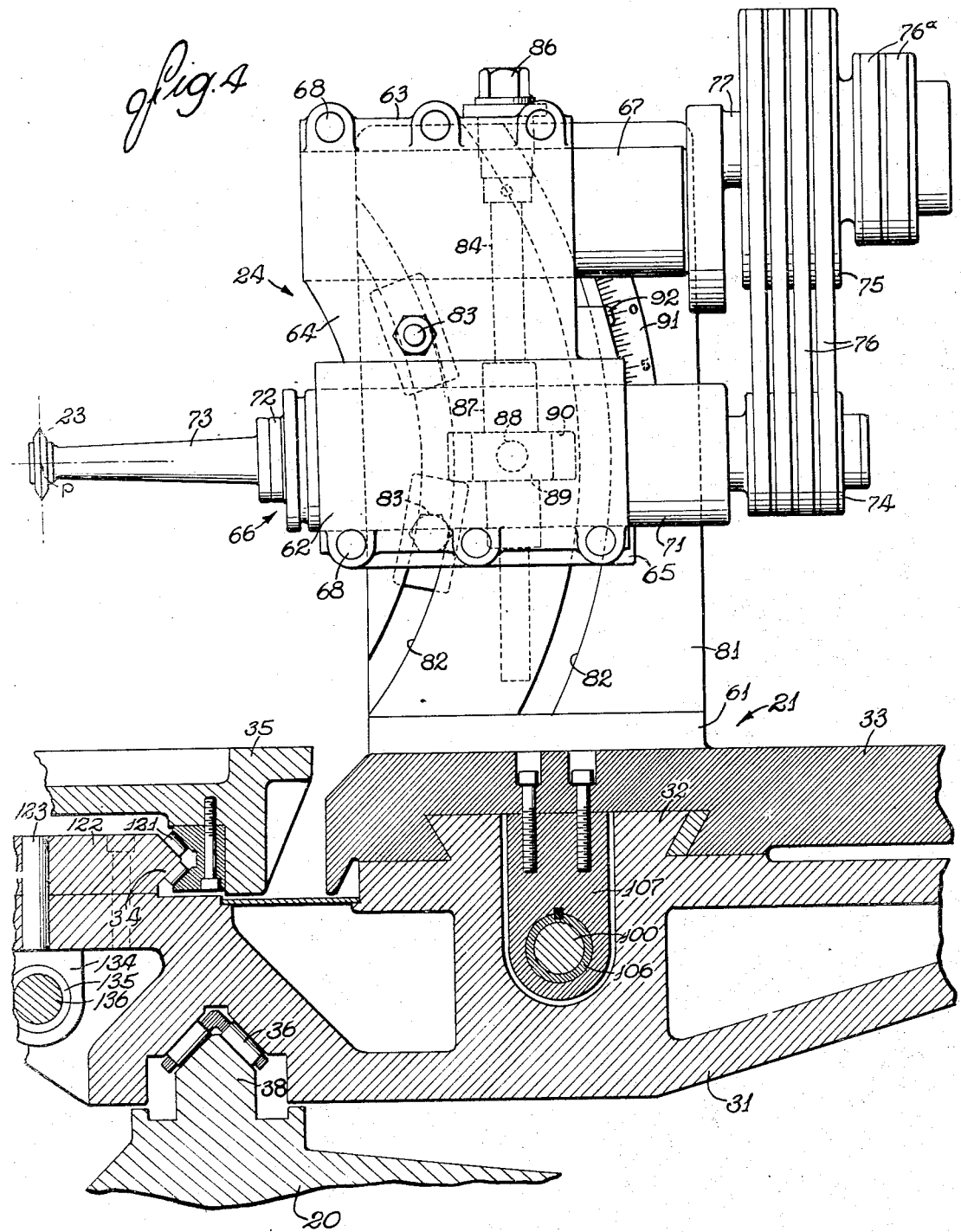

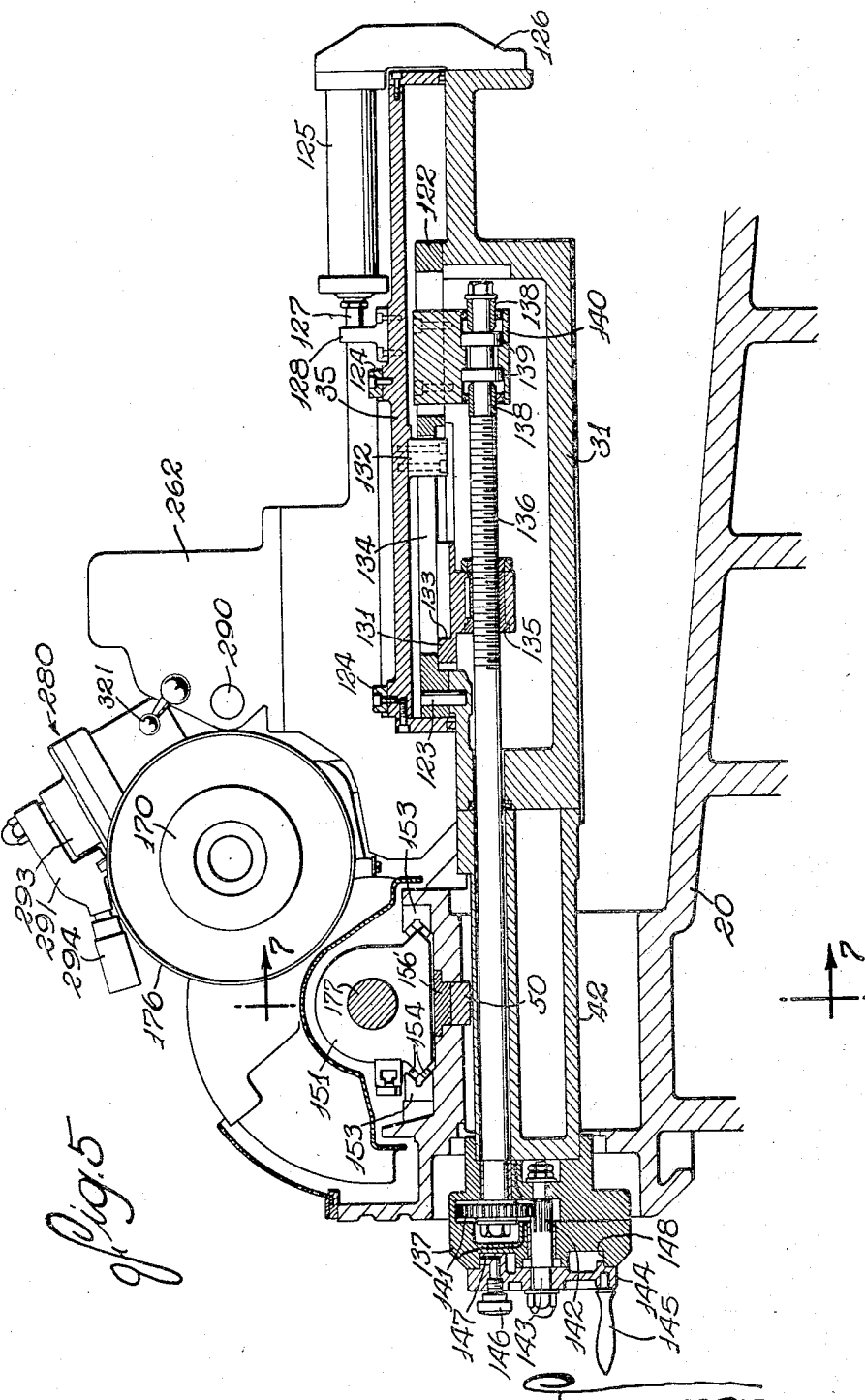

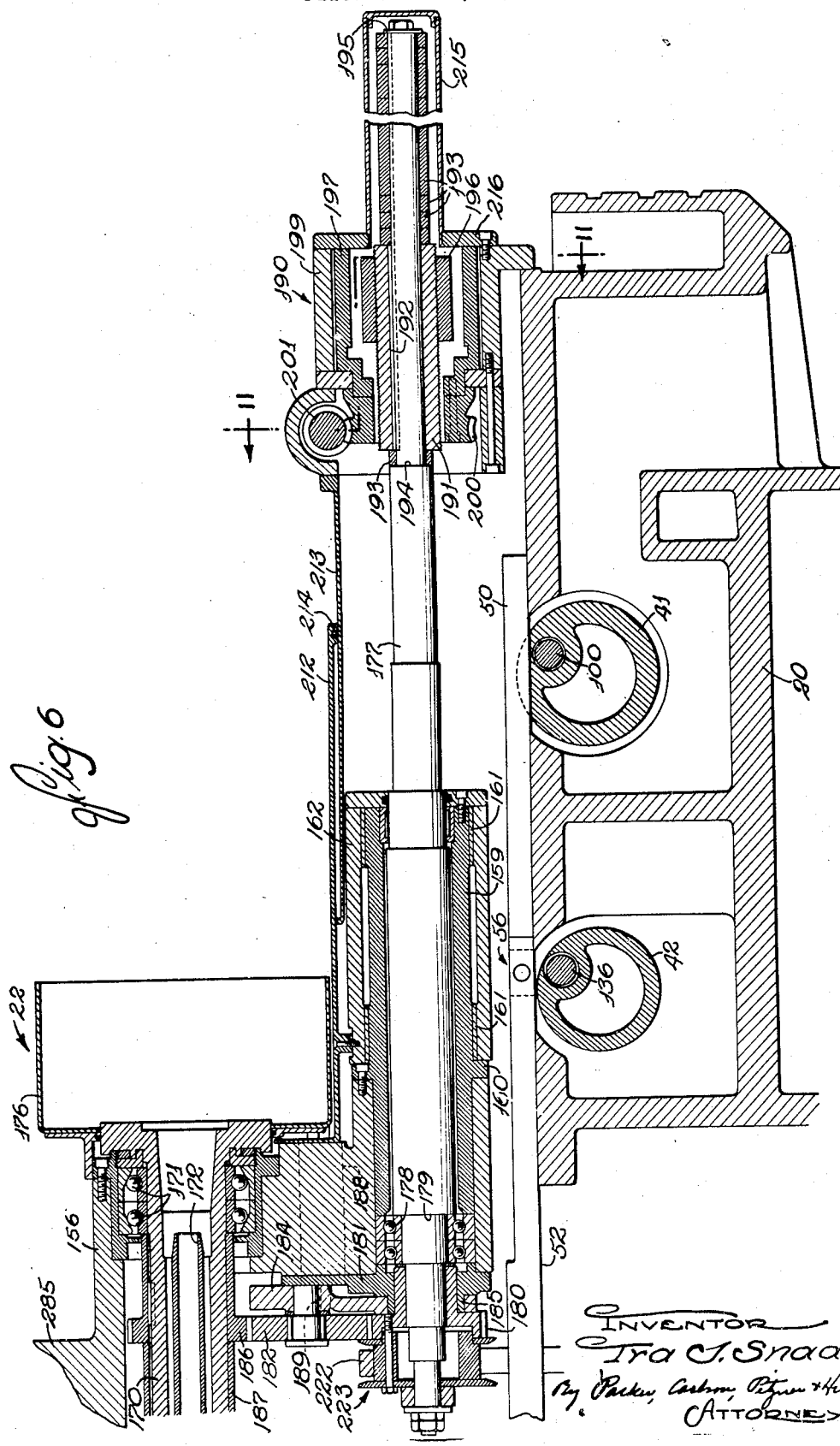

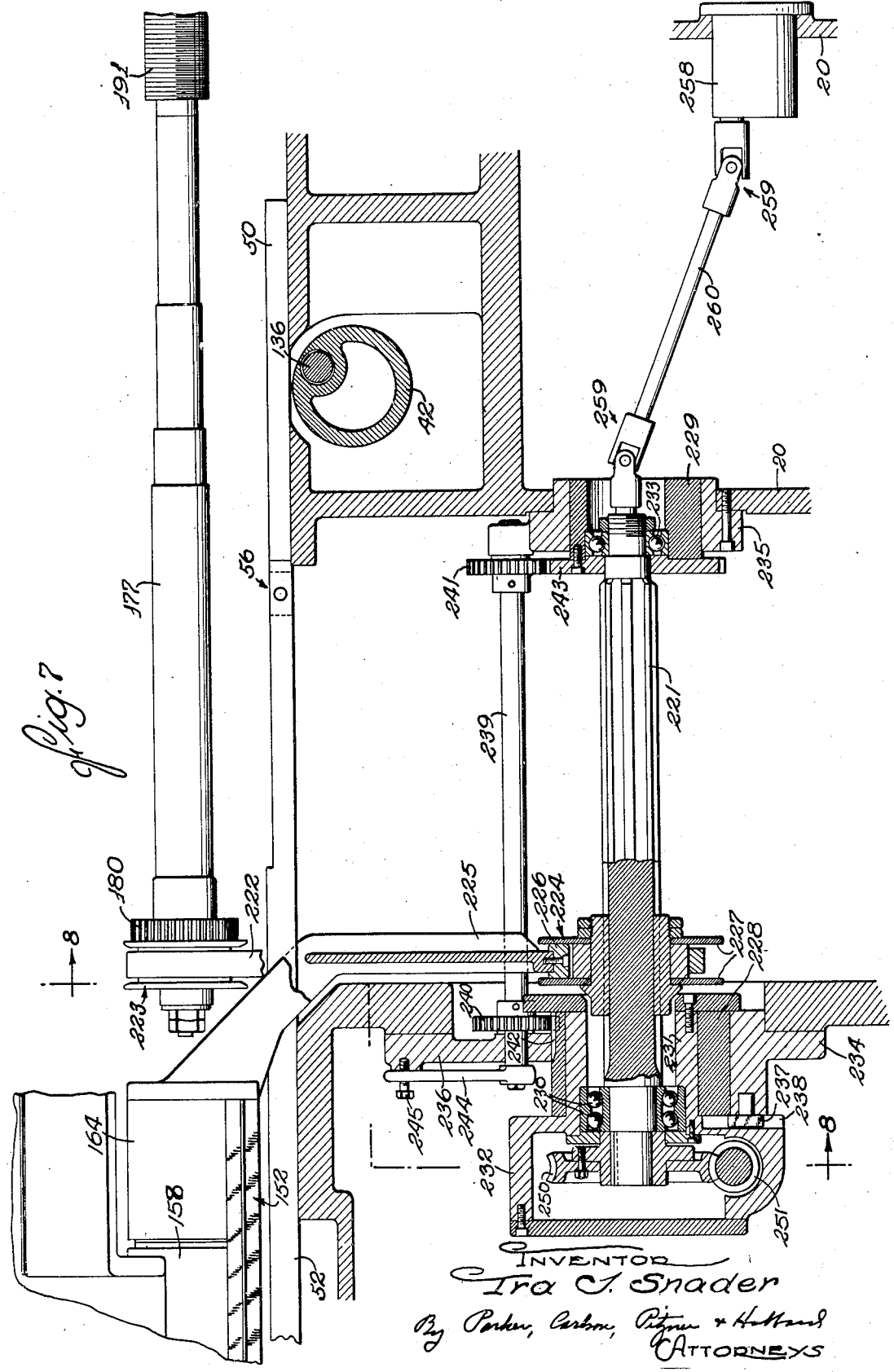

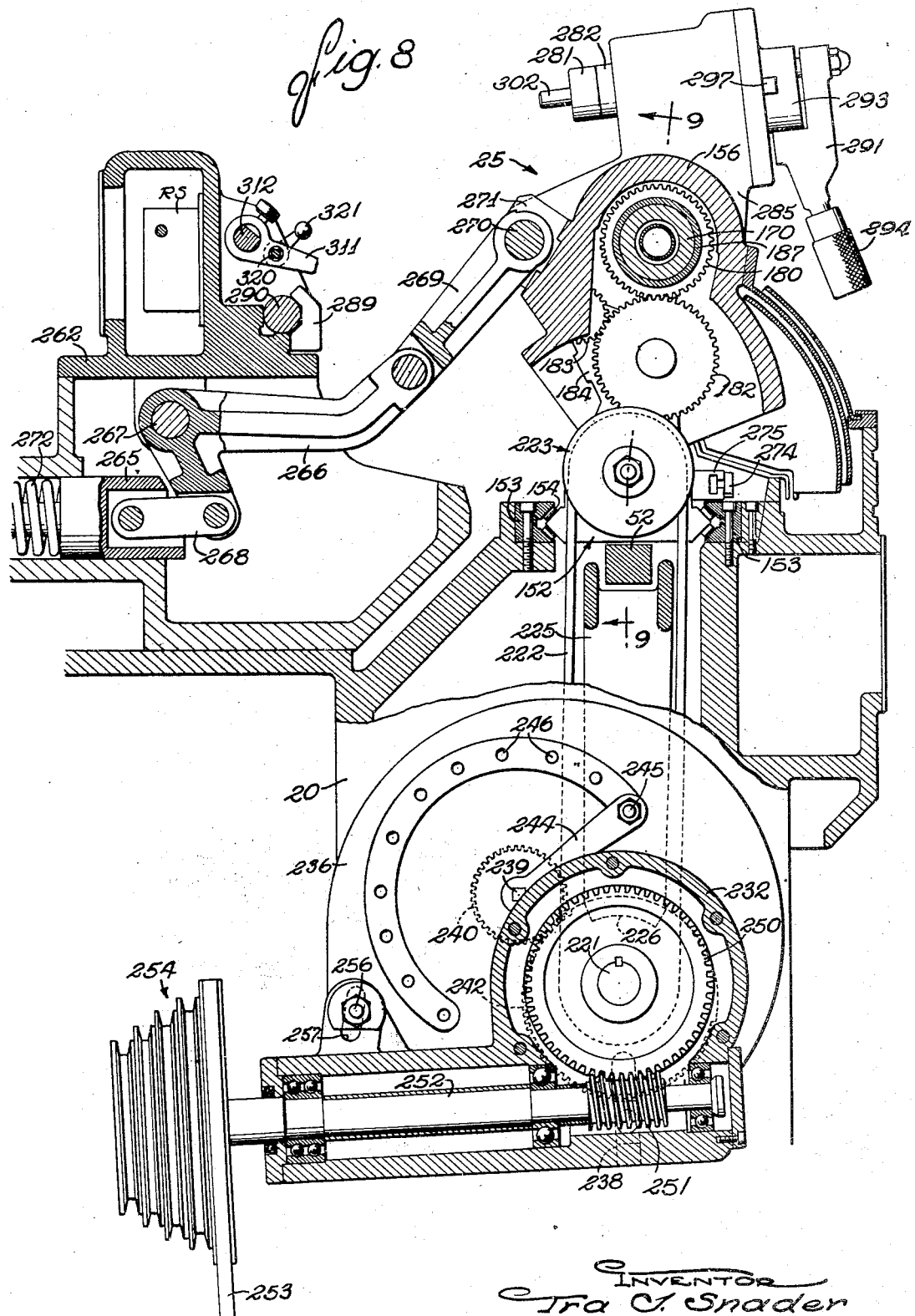

April 20, 1943.  I. J. SNADER  2,316,816
SCREW THREAD GRINDING MACHINE
Filed Oct. 30, 1940  11 Sheets-Sheet 9
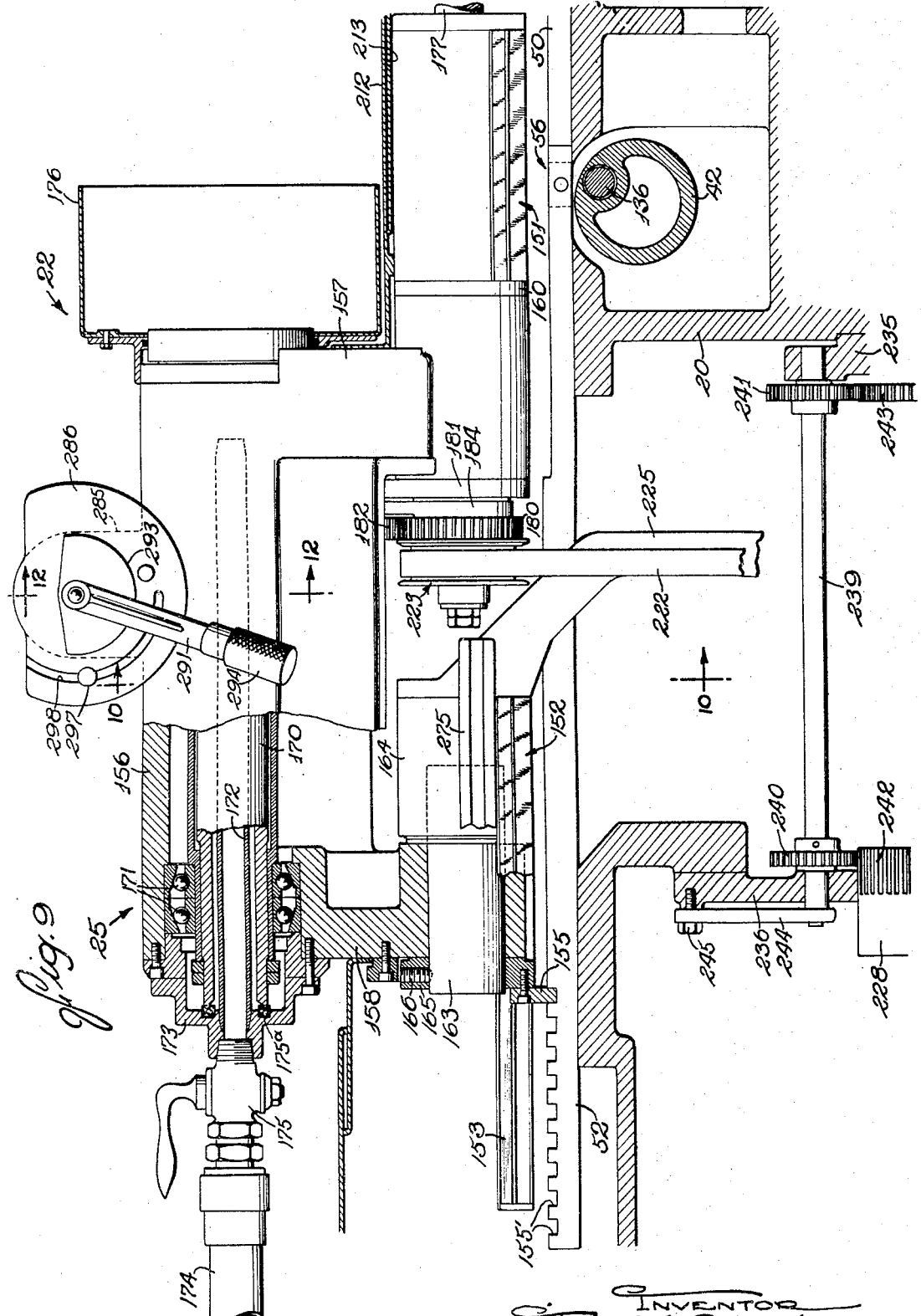

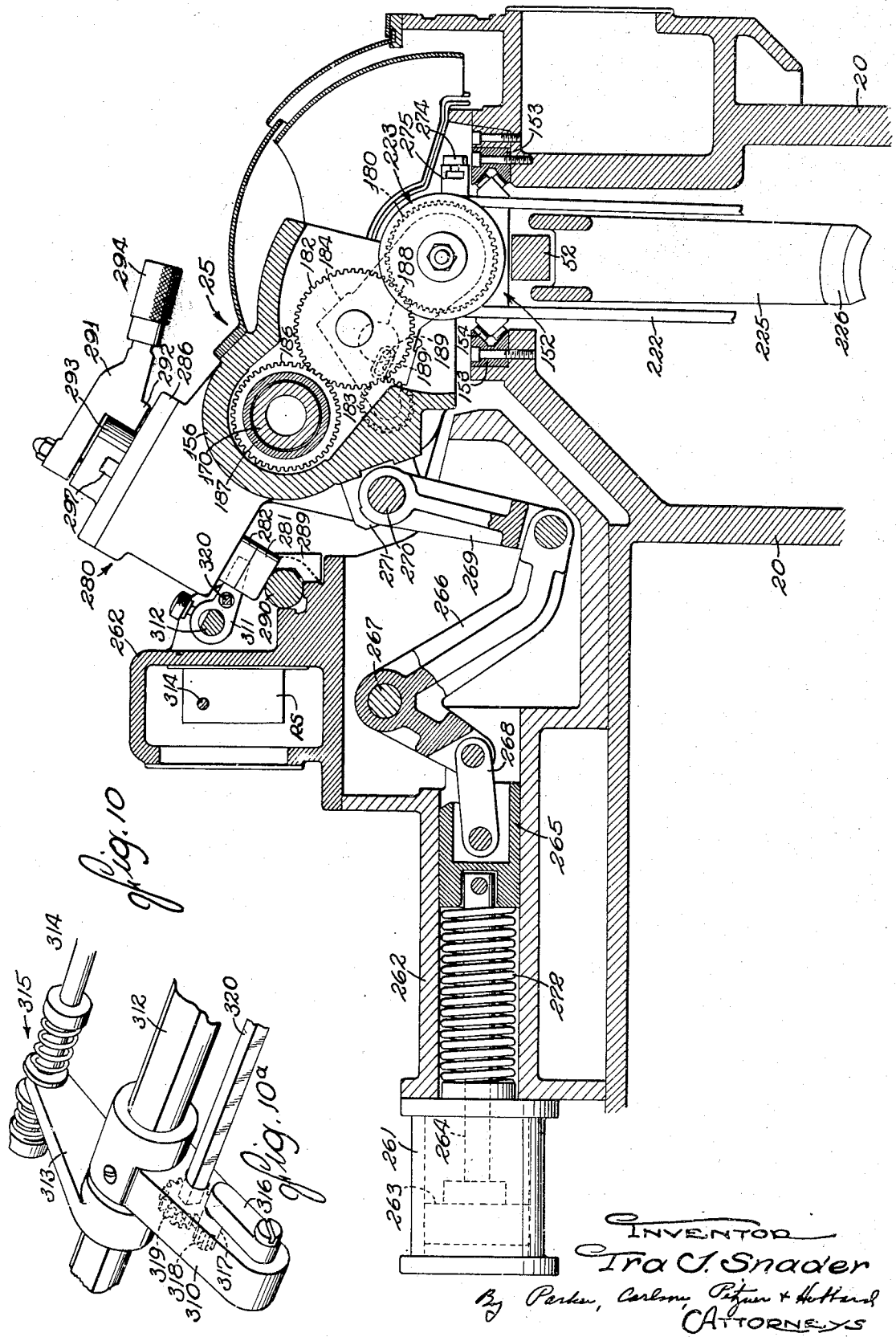

April 20, 1943.  I. J. SNADER  2,316,816
SCREW THREAD GRINDING MACHINE
Filed Oct. 30, 1940    11 Sheets-Sheet 11
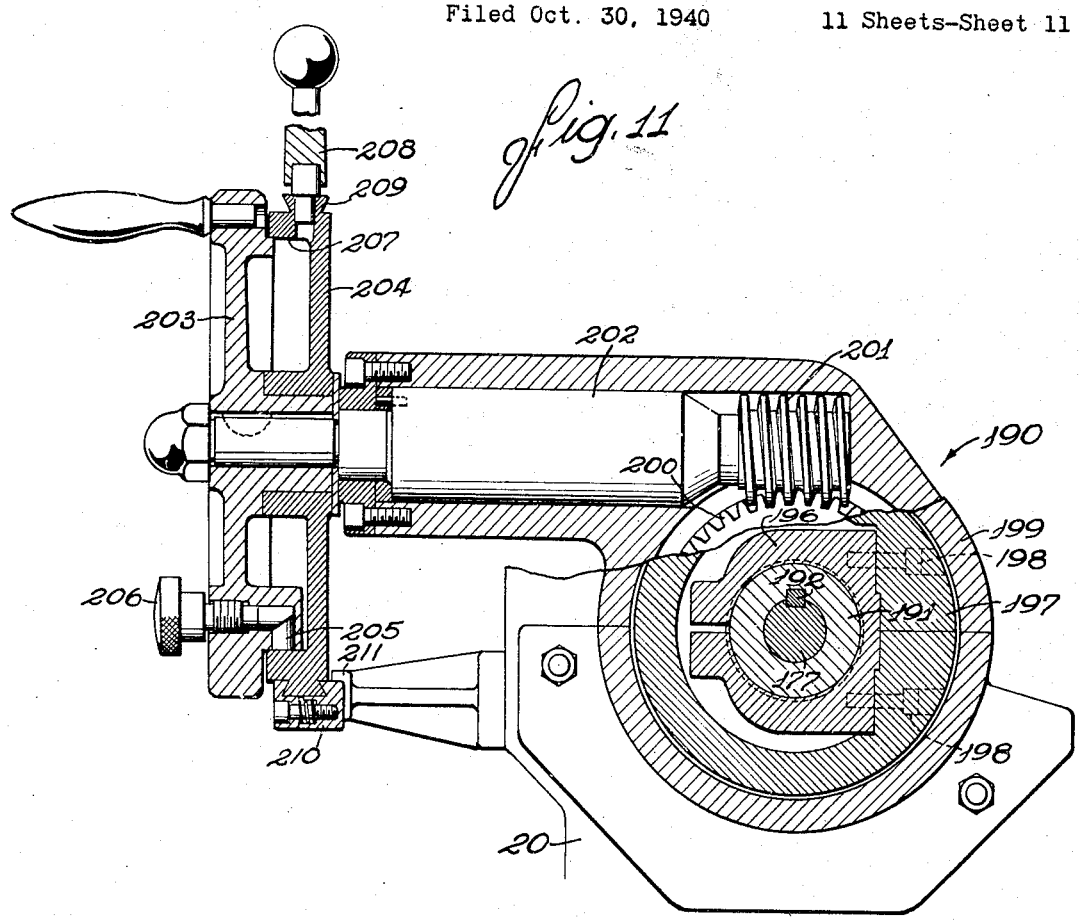
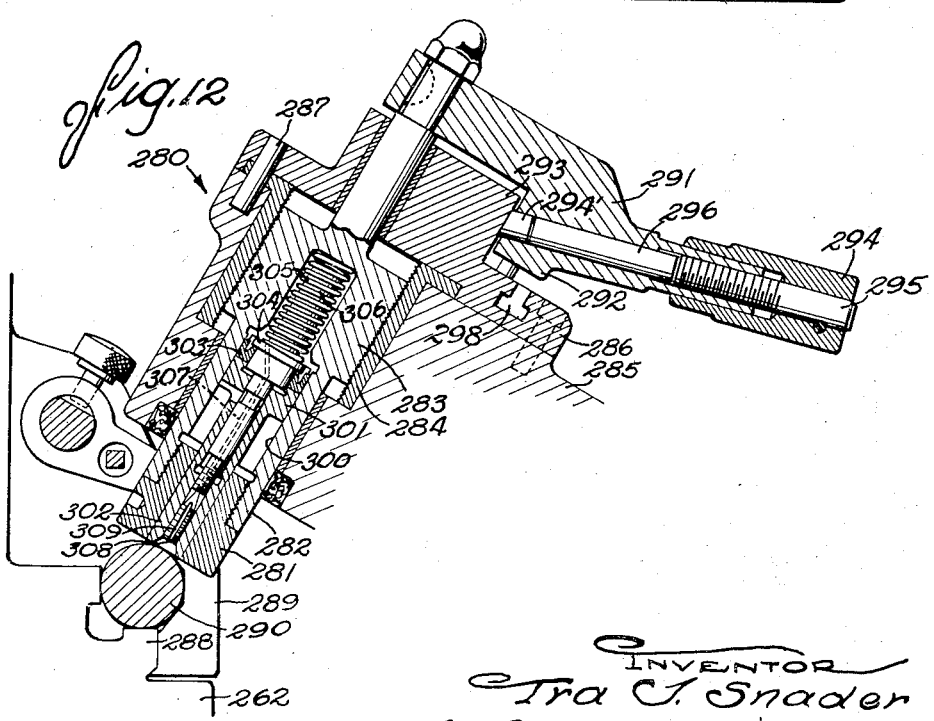
INVENTOR
Ira J. Snader
By Parker, Carlson, Pitzner & Hubbard
ATTORNEYS Patented Apr. 20, 1943

2,316,816

UNITED STATES PATENT OFFICE 2,316,816

SCREW THREAD GRINDING MACHINE

Ira J. Snader, Detroit, Mich., assignor to Ex-Cell-O Corporation, Detroit, Mich., a corporation of Michigan Application October 30, 1940, Serial No. 363,445

21 Claims. (Cl. 51—95)

The invention relates to thread grinding machines generally and more particularly to an improved machine for grinding internal screw threads.

One object of the invention is to provide a precision thread grinding machine of the above general character which is especially suitable for operation under high production conditions and which is readily adjustable for grinding either straight or tapered threads in a wide variety of different sizes and thread forms.

Another object is to provide an improved internal screw thread grinding machine embodying novel means for controlling relative feed of the work and grinding wheel to insure a high degree of accuracy in the finished product.

Another object is to provide novel means for supporting the work so that it may be suitably presented to the grinding wheel yet readily accessible for loading and gauging.

Still another object is to provide novel lead screw adjusting means for accurately matching the grinding wheel to preformed threads of the work piece and for effectually neutralizing any back lash in the lead screw drive and associated parts.

A further object is to provide novel means for coordinating a dressing device with an adjustable grinding wheel so as to dress the wheel to the correct shape for the particular work it is set to perform and to maintain a predetermined relationship between the tool and work at all times.

Another object is to provide novel means for tensioning the driving belts, chains, etc., by which the various machine elements are driven.

Other objects and advantages of the invention will become apparent from the following detailed description of the preferred embodiment illustrated in the accompanying drawings in which:

Figure 1 is a perspective view of an internal screw thread grinding machine embodying the features of the invention.

Fig. 2 is a skeleton perspective view of the machine showing the relationship of the operating and adjusting elements.

Fig. 3 is a transverse vertical sectional view through the grinding wheel supporting structure taken along the line 3—3 of Fig. 1.

Fig. 4 is a vertical sectional view taken along the line 4—4 of Fig. 3 showing details of the grinding wheel support.

Fig. 5 is a vertical sectional view through the wheel supporting structure taken along the line 5—5 of Fig. 1.

Fig. 6 is a sectional view taken on a vertical plane through the axis of the main feed shaft substantially along the line 6—6 of Fig. 3.

Fig. 7 is a vertical sectional view taken along the line 7—7 of Fig. 5 showing details of the mechanism for driving the main feed shaft.

Fig. 8 is a transverse sectional view of the work supporting head and the driving and actuating mechanisms for the same taken along the line 8—8 of Fig. 7, the head being shown in loading or gauging position.

Fig. 9 is a sectional view of the work supporting head taken on a plane through the axes of the work supporting spindle and the main feed shaft substantially along the line 9—9 of Fig. 8.

Fig. 10 is a transverse sectional view of the work supporting head and associated apparatus taken along the line 10—10 of Fig. 9 showing the head in grinding position.

Fig. 10ª is a fragmentary perspective view showing details of the reversing mechanism.

Fig. 11 is a fragmentary sectional view of the master feed screw and nut assembly taken along the line 11—11 of Fig. 6.

Fig. 12 is a fragmentary sectional view of the work head positioner taken in a vertical plane substantially along line 12—12 of Fig. 9.

While the invention is susceptible of various modifications and alternative constructions, I have shown in the drawings and will herein describe in detail, the preferred embodiment, but it is to be understood that I do not thereby intend to limit the invention to the particular form disclosed but intend to cover all modifications and alternative constructions falling within the spirit and scope of the invention as expressed in the appended claims.

The machine selected to illustrate the invention comprises generally an elongated horizontally disposed base 20 having at one end a grinding wheel supporting structure 21 (Figs. 1-4) and at the other end a translatable work carriage 22 (Figs. 1 and 6-10). In this machine a grinding wheel 23 is rotated in a relatively fixed position while a work piece W (Fig. 2) is rotated and fed axially across the plane of the wheel at a rate determined by the lead or pitch of the threads to be ground thereon. The grinding wheel 23 is suitably supported on a housing or head 24 swiveled to the wheel supporting structure so that it may be accurately alined with the helix angle of any thread within the range of the machine.

To regulate the depth of cut taken by the grinding wheel, rough adjustments are made by shifting the wheel head transversely of the work while fine adjustments are effected by a lateral shifting of the work. To this end the work is supported on a head 25 swiveled to the work carriage for pivotal movement about an axis parallel to the reciprocatory path of the carriage. This mounting of the head is further advantageous in permitting the head to be swung toward the front of the machine into a conveniently accessible position for loading or gauging the work. For grinding taper threads the entire wheel supporting structure 21 is shifted transversely of the base in timed relation to the feed of the work.

The wheel supporting structure is additionally arranged to carry a suitable wheel dresser or truing device. The device is preferably located intermediate the wheel head and work head and positioned to engage the wheel on the same side that the wheel engages the work. With this arrangement the dresser acts as a sizing device and materially facilitates the maintenance of the correct relationship between the grinding wheel and work regardless of the number of dressing operations or the variations of the diameter of the wheel due to successive dressings.

Referring more particularly to Figs. 2-5 of the drawings the wheel supporting structure 21 comprises a primary slide 31, hereinafter called the taper slide, having on its upper face a dovetailed slideway 32 for a secondary slide 33, conveniently called the wheel slide, and spaced parallel V-ways 34 for a dresser slide 35 (Fig. 5). The taper slide as herein shown is in the form of a flat, generally rectangular table supported for movement transversely of the machine base 20 by rollers 36 (Figs. 2 and 4) operating on parallel horizontal flat ways 37 and inverted V-ways 38 formed on the upper part of the base.

Projecting from the front end of the taper slide and out through the front wall of the machine base are a pair of hollow generally cylindrical stems 41 and 42 alined respectively with the ways for the wheel slide and the dresser slide. These stems carry the manual controls for adjusting the position of the slides as will be described in detail hereinafter.

The taper slide 31 and apparatus carried thereby is urged rearwardly by a coiled compression spring 45 interposed between a thrust plate 46 fixed to the rear wall of the slide and a thrust block 47 bolted or otherwise rigidly secured to the machine base. A guide rod 48 secured at one end to the plate 46 and slidable in an aperture in the block 47 extends through the spring to maintain it in place.

Movements of the taper slide under the action of the spring are controlled by a cam bar 50 coacting with a follower roller 51 on the slide. The cam bar, in this instance, is affixed at one end to a push bar 52 operatively secured to the work carriage 22 as will appear presently, so that the cam bar follows the work in its feed movements relative to the grinding wheel. As herein shown, the roller is journaled on a vertical pin 53 fixed to the stem 41, the stem being notched as at 54 for the reception of the roller and the bar.

It will be apparent from the foregoing that the position of the taper slide at any instant in the operating cycle will depend upon the form of the front edge of the bar 50 against which the follower roller is urged by the spring 45. Thus by providing a cam bar appropriately shaped in accordance with the taper of the work piece to be ground, as indicated by the broken line 55 in Fig. 2, the slide and grinding wheel carried thereby will be caused to automatically follow the proper course as the work is fed to the wheel. Conversely, straight work may be ground by providing a straight cam bar which will operate to maintain the taper slide in fixed position throughout the grinding operation. To facilitate interchange, the cam bars are arranged to be disengageably secured to the push bar 52 as by an interfitting lug and notch connection 56.

The wheel slide 33 as herein shown comprises a generally rectangular table dovetailed to the slideway 32 on the taper slide so that in addition to moving with the taper slide it is also capable of moving relative thereto but in a path parallel to the path of the latter slide. Adjacent its front end the wheel slide is provided with an upstanding bracket 61 for supporting the wheel head 24. This head is preferably a rigid metal casting having two vertically and laterally offset parallel cylindrical portions 62 and 63 connected by webs 64 with a vertical back portion 65. The cylindrical portions are slotted longitudinally to form split friction clamping sleeves for a grinding wheel assembly 66 and an idler pulley supporting stud 67, respectively. Bolts 68 threaded into flanges into opposite sides of the slots serve to draw the sleeves into clamping position.

The wheel assembly 66 may be of any suitable and well known type such as a high speed grinding spindle of which various kinds are in general use. As herein shown, the assembly comprises a cylindrical shell 71 in which is journaled a spindle 72 having at one end an interchangeable quill 73 carrying the grinding wheel 23. The shell is adapted to fit into the sleeve 62 and is rigidly clamped therein by tightening the bolts 68. The rear end of the spindle is equipped with a multiple V-groove driving pulley 74.

In the present instance the spindle 72 is driven from an idler pulley 75 by a series of V-belts 76, the idler pulley being driven by a motor M through a pair of V-belts 76ª. The idler pulley is journaled on an eccentric shaft 77 projecting from one end of the stud 67 which is frictionally clamped in the split sleeve 63. Due to the eccentric location of the shaft 77, the driving belts can be suitably tensioned by simply rocking the stud about its longitudinal axis before clamping it in the sleeve. Moreover, the idler pulley and its support can be shifted axially to maintain correct alinement with the spindle pulley 74 in the various adjusted positions of the wheel assembly 66.

In grinding threads, the grinding wheel must, of course, be alined with the helix angle of the threads. To provide for such alinement the grinding head is supported on a swivel mounting which allows the head to pivot in a vertical plane about a reference point P marking the intersection of the wheel axis with a horizontal line passing through the point at which the wheel engages the work. In setting up the machine the wheel is adjusted to this point by shifting the tool assembly axially in its clamping sleeve as required by the particular spindle or quill in use. At the same time the idler pulley and its supporting stud may be set to maintain the pulleys in alinement.

The swivel support for the wheel head 24 is provided in this instance by a mounting plate 81 bolted or otherwise rigidly secured to the vertical face of the bracket 61. As will be seen by reference to Fig. 4, the plate is provided on its front face with a pair of arcuate T-slots 82 formed on radii centered at the point P. T-bolts 83 passing through the back portion 65 of the head and engaging in the slots serve to guide the head in its pivotal movement and to lock the same in any set position.

For adjusting the position of the head, an adjusting screw 84 is rotatably anchored in a vertical slot 85 in the plate 81, the top 86 of the screw being appropriately shaped for engagement by a suitable wrench. Disposed in the slot 85 and cooperating with the adjusting screw is a nut 87 having a forwardly projecting cylindrical boss 88 fitting in a socket in a generally rectangular slide block 89 seated in a transverse slot 90 in the back portion 65 of the head. The arrangement is such that vertical movements of the nut 87 resulting from the rotation of the adjusting screw are effective to shift the head along the slots 82 which guide the head in an arcuate path centered at the point P. In this adjustment the block 89 swivels with respect to the boss 88 and moreover it slides along the slot 90 to maintain it in alinement with the nut 87. To facilitate adjustment of the head a graduated plate 91 is fixed to the face of the mounting plate 81 to cooperate with a pointer 92 carried by the head.

The motor M which drives the grinding wheel spindle is desirably carried on the wheel slide 33 at the rear of the head supporting bracket 61. To maintain proper belt alinement in the various adjusted positions of the wheel head and the wheel assembly, the motor is mounted on a cradle 93 dovetailed to an arcuate slideway 94 fixed to the wheel slide. The motor may thus be tilted by rocking the cradle on its slideway to conform to the alinement of the wheel head as above explained. Moreover, the motor is secured to the cradle by means of a T-bolt 95 engaging T-slots 96 extending longitudinally of the cradle so that it may be shifted to the left or right to conform to any set position of the idler pulley. As shown in Fig. 1, the belts and pulleys are enclosed by suitable guards 97.

The wheel slide 33 is adapted to be shifted along its guideway by means of a feed screw 100 actuated by suitable manual controls accessible at the front of the machine to set the grinding wheel in a predetermined position of adjustment with respect to the work and dressing device. As shown in Fig. 3, the feed screw projects forwardly through the hollow stem 41 of the taper slide and is supported at its inner end in a thrust block 101 which is disposed in a recess in the face of the taper slide and bolted or otherwise rigidly secured thereto. The feed screw is held against endwise movement by means of thrust sleeves 102 and 103 carried on the reduced end portion of the shaft and respectively engaging roller thrust bearings 104 and 105 fixed in the thrust block 101. Forwardly of the sleeve 102 the feed screw is threaded for engagement with a feed nut 106 keyed in a recess in a block 107 bolted or otherwise rigidly secured to the underside of the wheel slide 33. Thus, rotation of the feed screw acts through the nut to impart forward and reverse movements to the slide.

The outer end of the feed screw 100 projects from the stem 41 into a housing 108 and has fixed thereto a gear 109 meshing with a pinion 110 on a stub shaft 111 journaled in the housing. The outer end of the shaft 111 is keyed to a hand wheel 112 which may be rotated by a handle 113 to drive the feed screw and thus shift the slide on its guideway. The slide may be locked in adjusted position by means of a thumb screw 114 threaded into the hand wheel and having its inner end tapered for engagement with the similarly tapered end of a radially disposed locking pin 115 slidably supported in a boss on the inner side of the hand wheel. The boss projects into a cylindrical recess 116 in the housing 108 and the thumb screw acts to force the locking pin outwardly into frictional engagement with the peripheral wall of the recess to prevent rotation of the hand wheel and parts associated therewith. To facilitate accurate adjustment of the slide an adjustable pointer 117 is provided on the hand wheel for cooperation with the suitable indicia on the gear housing. As herein shown the pointer is secured to the hand wheel by means of a T-bolt 118 operating in an arcuate T-slot 119 in the face of the wheel.

The dresser slide 35 is located between the wheel slide 33 and the work head 24 and is supported for reciprocation in a path generally parallel to the reciprocatory path of the wheel slide. The support is provided in this instance by roller bearings 121 operating on the V-ways 34 which are formed on opposite side edges of a flat generally rectangular plate 122 bolted or otherwise rigidly secured to the face of the taper slide 31. A dowel pin 123 serves to locate the plate accurately with respect to the wheel slide. The dresser slide itself comprises a flat generally rectangular table having secured to its upper face a pair of spaced keys 124 for accurately locating a wheel dresser or truing device on the slide. The dresser (not shown) may be of any suitable character, for example, a universal dresser of the general type disclosed and claimed in my copending application Serial No. 350,362, filed August 3, 1940.

In the exemplary machine the dresser slide is normally held in a retracted or inactive position while the grinding wheel is operating on the work and is shifted forwardly to a predetermined position of adjustment with respect to the work to dress the wheel. This dressing operation is performed at the point at which the wheel engages the work thus enabling the dresser to function as a sizing device for accurately determining the depth of cut taken by the wheel.

While any suitable means may be utilized for shifting the dresser slide between its operated and inactive positions, it is preferred to employ pressure fluid actuated means for this purpose. The actuating means as herein shown comprises an air cylinder 125 rigidly mounted at its rear end on a bracket 126 fast on the taper slide. The cylinder is provided with a suitable double acting piston having its forwardly projecting piston rod 127 anchored to a thrust block 128 bolted to the dresser slide. Air under pressure is admitted to opposite ends of the cylinder selectively by suitable controls including a manual lever 129 (Fig. 1) located at the front of the machine. These controls are interlocked with the controls for actuating the work head so as to effectually prevent interference between the elements as will appear presently.

Since the tool dresser acts as a sizing device and determines the point at which the grinding wheel engages the work, it is essential to locate its operated position with a high degree of accuracy. This is accomplished in the present instance by a stop member 131 (Fig. 5) positioned below the dresser slide for engagement by a stop block 132 rigidly secured to the underside of the slide. The stop member 131 is in the form of a generally rectangular block having a recess in its upper surface defining a shoulder or abutment 133 disposed in the path of the stop block 132. The stop member is slidably confined at its upper end in a slot 134 extending longitudinally of the V-plate 122 with its lower end portion projecting into a recess in the face of the taper slide. Keyed in the lower portion of the stop member is a nut 135 coacting with a feed screw 136 which extends forwardly through the stem 42 into a gear housing 137 mounted on the outer end of the stem. The inner end of the feed screw is supported by opposed thrust sleeves 138 carried on the reduced end portion of the feed screw and engaging suitable antifriction thrust bearings 139 set in a recess in a thrust block 140 rigidly secured to the taper slide.

At its forward end, the feed screw 136 is provided with a gear 141 meshing with a pinion 142 herein shown as integrally formed on a stub shaft 143. The latter shaft is suitably journaled in the housing 137 and to its outer end is keyed a hand wheel 144 adapted to be turned by a handle 145. Through this arrangement the feed screw may be rotated to shift the stop 131 to any desired set or adjusted position in which it accurately locates the forward limit position to which the dresser slide may be shifted by the actuating means. The stop may then be locked in set position by means of a thumb screw 146 on the hand wheel acting to shift a radially disposed locking pin 147 into frictional engagement with the peripheral wall of a cylindrical recess 148 in the gear housing. A suitable scale 149 on the housing adjacent the wheel facilitates accurate setting of the stop.

After the grinding wheel and dresser have been adjusted or set in the manner above described, the work piece W is advanced into engagement with the grinding wheel by a feed movement of the work carriage 22 on which the work head 25 is swiveled as mentioned hereinbefore. The work carriage as herein shown comprises a pair of axially alined slides 151 (Figs. 2, 6 and 8–10) and 152 (Figs. 2, 7 and 9) hereinafter referred to respectively, as the right hand and left hand slides. Both slides are supported on a common horizontal guideway extending longitudinally of the machine base or perpendicular to the guideway for the taper slide previously described. The guideway in this instance is formed by V-shaped grooves in the opposed faces of spaced parallel guide bars 153 bolted or otherwise rigidly secured to the top of the machine base. Roller bearings 154 are interposed between the slides and the ways to reduce friction.

The action of the cam bar 50 in controlling the position of the taper slide 31 in the movements of the work carriage has previously been described. Movements of the carriage are imparted to the cam bar by the push bar 52 which, as shown in Figs. 2 and 9, is adjustably connected to the left hand slide 152 by a retainer plate 155 removably fixed to the slide and engaging in spaced notches 155' in the upper face of the bar. The bar, incidentally, is slidably supported in a longitudinal channel in the machine base which is closed by an elongated cover member 156' (Fig. 3).

The slides 151 and 152 support the work head 25 which preferably comprises an elongated hollow casing portion 156 having depending legs 157 and 158 at opposite ends for pivotal connection with the respective slides. For connecting the head with the slide 151 the leg 157 is apertured to receive one end of the hollow cylindrical plug 159 (Fig. 6) which is rigidly secured to the leg by bolts passing through a peripheral flange 160 on the plug. The other end of the plug is journaled in bushings 161 carried in a hollow cylindrical sleeve member 162 formed integrally with the slide 151.

The other leg 158 of the head structure is journaled on a shaft 163 supported in a pair of cylindrical members 164 and 165 formed on the left hand slide 152, the members being spaced apart as shown in Figs. 2 and 9 for the reception of the leg. A locking screw 166 threaded into the member 165 holds the shaft in place. Both of the above members are arranged on a common axis with the sleeve member 162 of the right hand slide which axis is parallel to the guideway for the slides. The work head is accordingly adapted to rock transversely of the reciprocating path of the work carriage between a rearward or operating position and a forward loading or gauging position as will be described in more detail hereinafter.

The work piece to be operated upon by the grinding wheel is supported on the head by a suitable chuck (not shown) bolted or otherwise rigidly secured to the nose of a hollow spindle 170 (Figs. 6 and 9) supported on antifriction bearings 171 in the hollow casing portion 156 of the head. The spindle is disposed with its longitudinal axis parallel to the axis of the guideway for the work carriage so that in the feed movements of the carriage the work supported by the spindle is fed in an axial direction across the plane of the grinding wheel.

Coolant is supplied to the work during the grinding operation through a hollow tube 172 anchored at one end in a cap 173 bolted to the casing at the rear of the spindle, the tube extending through the spindle substantially to the nose portion thereof. Coolant supplied from any suitable source is delivered to the tube through a pipe 174 and valve 175 which is threaded into the cap in communication with the tube. A packing gland or gasket 175ᵃ interposed between the end of the spindle and the adjacent face of the cap excludes coolant from the interior of the casing and thus protects the spindle bearings. To prevent objectionable splashing of the coolant, a generally cylindrical guard 176 is secured to the head to enclose the outer end of the spindle and to extend over the work piece.

In grinding screw threads, the work must be rotated in timed relation to its axial feed as determined by the pitch of the threads being ground. Exact coordination of rotation and feed is obtained in the present instance by utilizing a common power actuated member or feed shaft 177 (Figs. 2 and 5–9) for driving the work spindle and for imparting feed movements to the carriage. The feed shaft is arranged axially of the head supporting plug 159, that is, coaxial with the pivot for the work head and is rotatably supported by an antifriction bearing 178 seated in the plug receiving recess in the leg 157. The inner race ring of the bearing is confined between a shoulder 179 on the shaft and the hub of a gear 180 fast on the shaft while the outer race ring of the bearing is confined between the end of the plug 159 and a cover plate 181 bolted to the leg 157 to prevent endwise movement of the shaft relative to the work head in either direction.

The gear 180 is utilized to drive the work spindle either forwardly or reversely for grinding right or left hand threads. For this purpose a pair of intermeshing gears 182 and 183 (Figs. 2, 6 and 8) are rotatably mounted on a shiftable bracket 184 which is supported on a cylindrical extension 185 of the cover plate 181 to pivot about the axis of the feed shaft. The gear 182, conveniently called the drive gear, is permanently meshed with the gear 180 on the feed shaft and is adapted when the bracket is swung to one position to mesh with a gear 186 keyed to the work spindle 170. A sleeve 187 encircling the spindle holds the latter gear against endwise movements relative to the spindle.

The gear 183 is an idler gear permanently meshing with the driving gear 182 and adapted when the bracket 184 is swung to its alternate position to mesh with the spindle gear 186. In this alternate position of the bracket, the drive gear is disengaged from the spindle gear so that the spindle is driven reversely through the idler gear. For shifting the bracket, a short adjusting shaft 188 journaled in the leg portion 157 of the head is provided at one end with an eccentrically disposed pin 189 engaging in a slot 189' in the bracket. The other end is conveniently accessible at the front of the head for turning by means of a wrench or other suitable tool.

The feed shaft 177 acts to impart feed movements to the work carriage through the medium of a master lead screw and nut assembly 190 (Figs. 6 and 11) which is readily interchangeable for grinding threads of different pitch. The assembly as herein shown comprises a lead screw member 191 in the form of an elongated sleeve having accurately formed threads corresponding in pitch to the pitch of the threads to be ground. The screw member is adapted to fit over the reduced outer end portion of the feed shaft and is nonrotatably secured thereto as by a key 192. Annular spacers 193 interposed between the inner end of the member and a shoulder 194 on the shaft and between the outer end of the member and a stop washer 195 removably fixed to the end of the shaft serve to accurately position the member on the shaft and to hold it against endwise movement relative thereto. The spacers are interchangeable so that the position of the lead screw may be varied as required for different types of work. Moreover, lead screws of different length may be employed thus making it unnecessary to utilize long relatively expensive lead screws for relatively short work pieces.

Cooperating with the lead screw 191 is a relatively stationary master lead screw nut 196 which is removably secured within a hollow, generally cylindrical supporting member 197 as by dowel screws 198. While the nut remains stationary during the operation of the machine, it is at times desirable to rotate it to advance the work carriage for accurately matching preformed threads in a work piece with the grinding wheel. To this end the supporting member is rotatably mounted in a housing 199 rigidly supported on the machine base 20. A worm wheel 200 (Fig. 11) fixed to one end of the member is arranged to be driven by a worm 201 carried on a cross shaft 202 journaled in the housing. A hand wheel 203 keyed to the outer end of the shaft provides convenient means for rotating the shaft.

Means is also provided for imparting incremental rotational steps of predetermined length to the feed nut supporting member to take up any back lash in the feed mechanism which may develop as the parts become worn from extensive use. This means as herein shown comprises a wheel 204 rotatably mounted on the hub of the hand wheel 203 and adapted to be locked thereto by a radially disposed pin 205 shiftable axially by a thumb screw 206 on the hand wheel into frictional engagement with a peripheral wall 207 of a recess in the wheel 204. A hand lever 208 is fixed to the wheel 204 in radially projecting relation for convenient manual operation.

In order to confine the movements of the nut within predetermined limits required to compensate for the back lash present at any given time, the wheel 204 is formed on its peripheral edge with a dovetailed way 209 on which are mounted a pair of adjustable dogs 210 adapted to cooperate with a stop 211 rigid with the housing 199. These dogs may be locked in place on opposite sides of the stop and spaced apart circumferentially of the wheel so that the permitted angular movement of the wheel is just sufficient to take up the back lash.

In the exemplary machine the feed shaft and associated parts are effectually protected from the entry of dirt or other foreign matter by shields of sheet metal or the like. The intermediate portion of the feed shaft, the right hand slide 151 and the ways therefor are covered by a telescoping housing which automatically adjusts its length in accordance with the feed movements of the work carriage. The housing as shown in Fig. 6 comprises an outer guard member 212 fixed to the work head and telescoping over an inner guard member 213 fixed to the feed nut housing. A gasket 214 of felt or other suitable material provides a tight joint between the members yet permits the relative movement necessitated by the feed and return movements of the work head. The outer end of the feed shaft is enclosed by a tubular cap 215 carried on a cover plate 216 closing the end of the feed nut housing. The cover plate is secured to the housing in a manner permitting convenient removal to give access to the feed screw and nut assembly for replacement of the same.

Suitable power actuated means is provided for driving the feed shaft 177 in either direction to advance or retract the work carriage relative to the grinding wheel. In the exemplary machine, the drive for the feed shaft includes a splined drive shaft 221 (Figs. 2, 7 and 8) disposed in the machine base below and substantially parallel to the feed shaft. A flexible driving element 222 such as a belt or chain drivingly connects the two shafts. The driving element illustrated is in the form of an endless belt operating on one pulley or sprocket wheel 223 fast on the inner end of the feed shaft and a second pulley or sprocket wheel 224 splined on the drive shaft. Due to the splined connection, the sprocket wheel 224 is capable of being shifted axially of the shaft to maintain alinement with the sprocket wheel 223 as the latter reciprocates with the work carriage. Shifting of the sprocket wheel 224 along the drive shaft is effected in the present instance by means of a depending arm 225 rigidly secured at its upper end to the left hand slide 152 of the work carriage and having at its lower end a shoe 226 confined between a pair of spaced thrust rings 227 rigidly secured at opposite ends of the sprocket wheel.

To permit adjustment of the tension of the driving element or chain which may become necessary from time to time through wear in extended use, the drive shaft is journaled at opposite ends in eccentric supporting members or bushings 228 and 229. At its left end (as viewed in Fig. 7) the shaft is carried on an antifriction bearing 230 mounted on a hub portion 231 of a housing 232 (Fig. 7) which is mounted eccentrically in the bushing 228. At its opposite end the shaft is supported by an antifriction bearing 233 eccentrically disposed in the bushing 229. The bushings, in turn, are rotatably supported in bearing plates 234 and 235 carried on the machine base 20, the first mentioned bearing plate being formed with a flange-like extension 236 extending upwardly along the end wall of the base. Due to the eccentric location of the shaft with respect to the bearing surfaces of the bushings, rotation of the latter will operate to oscillate the shaft bodily and thus vary its distance from the feed shaft. Rotation of the housing 232 with its associated bushing is prevented by a headed pin 237 set in the bearing plate 234 and slidably engaging in a slot 238 in back of the housing.

Rotation of the bushings 228 and 229 is effected simultaneously by means of an adjusting shaft 239 journaled in the machine base above but parallel to the drive shaft. Gears 240 and 241 pinned to the adjusting shaft mesh respectively with gears 242 and 243 fixed to the respective bushings. A hand lever 244 engaged on the squared edge of the adjusting shaft is provided for rotating the same. At its outer end the lever carries a pin 245 which can be entered in any one of a series of arcuately arranged holes 246 in the bearing plate extension 236 to retain the adjusting shaft in set position.

For driving the shaft 221, the left end thereof (as viewed in Fig. 7) is extended into the housing 232 and has keyed thereto a worm wheel 250 meshing with a worm 251 carried by a cross shaft 252 journaled in the housing. The cross shaft is driven by a motor MI (Fig. 2) by a V-belt 253 and grooved pulley 254 which is keyed to the inner end of the shaft. The motor MI is of the reversible type and is adapted to be controlled manually by push button switches located on a switch panel SP (Fig. 1) at the front of the machine or automatically by a reversing switch RS (Fig. 10) actuated by the work head as will appear presently. To prevent the pull on the driving belt from rocking the housing structure and thus changing the tension of the driving chain, the housing is securely locked in set position by a locking bolt 256 rigidly anchored in the bearing extension 236 and projecting through a slot 257 in the housing.

The drive shaft 221 may be utilized conveniently for driving a lubricating pump 258 (Fig. 7) shown diagrammatically in Fig. 7 as mounted on the right hand end wall of the machine base 20. Since the drive shaft is mounted to oscillate for chain adjustment, the drive for the pump is desirably taken through an intermediate shaft assembly including a pair of universal joints 259 connected by a driving link 260.

Before initiating the feed of the work carriage, the work head must be swung from the inactive or loading position shown in Fig. 8 to the operating position shown in Fig. 10 in which the work is alined in operative relation with the grinding wheel 23. While the head can be swung manually between these two positions, it is preferred to employ power actuated means for this purpose. The power actuated means in its preferred form comprises a pressure fluid motor herein shown as an air cylinder 261 mounted on a rigid frame 262 secured to the machine base 20 at the rear of the head as shown in Fig. 10. The cylinder is fitted with a double acting piston 263 having a forwardly extending piston rod 264 operatively connected with a reciprocatory member or cross head 265 slidably supported in a guideway on the frame 262 for movement in a path perpendicular to the pivotal axis of the work head.

Movements of the cross head are communicated to the work head through a toggle mechanism including a bell crank lever 266 pivoted on a horizontal shaft 267 carried on the frame 262. One arm of the bell crank lever is connected by a link 268 with the cross head. The other arm of the lever which is substantially longer than the first mentioned arm, is operatively connected with the head by a link 269, the link being pivoted at one end to the bell crank and apertured at its other end to slidably receive a shaft 270 held between spaced pillow blocks 271 secured to the rear face of the work head. The sliding connection between the link and the shaft permits the actuating means to be stationarily supported on the base instead of reciprocating with the head and thus materially simplifies the machine structure. A spring 272 interposed between the adjacent ends of the cylinder 261 and cross head 265 counterbalances the weight of the head.

Air under pressure may be admitted to either end of the cylinder 261 selectively by means of suitable controls including a manually operable hand lever 273 conveniently accessible at the front of the machine. When air is admitted to the outer end of the cylinder, the piston and cross head are shifted forwardly thus rocking the head to the position shown in Fig. 8 in which the work spindle is readily accessible at the front of the machine for loading the work piece thereon or for gauging a work piece carried by the spindle. The admission of air to the inner end of the cylinder shifts the cross head rearwardly to break the toggle and swing the head to the operating position shown in Fig. 10.

The controls for the work head actuating mechanism are effectually interlocked to prevent actuation of the same to loading position when the work carriage is in an advanced position. For this purpose a suitable control valve V (Fig. 2) is interposed in the air line leading to the cylinder 261. A dog 274 (Figs. 2 and 8) adjustably mounted in a T-slotted bar 275 fixed to the left hand work carriage slide 152 is arranged to actuate the valve and block the admission of air to the cylinder at all times except when the work carriage is in its fully retracted position.

Since the operating position of the work head determines the lateral relationship of the work and grinding wheel and therefore the depth to which the grinding wheel will cut into the work, it is essential that this position be located with a high degree of accuracy. This is accomplished in the present instance by a novel positioning mechanism 280 (Figs. 8, 10 and 12) which is adjustable for varying the operating position in incremental steps so that fine adjustments for depth of cut can be quickly and accurately made. The positioning mechanism as shown in Fig. 12 comprises a hardened cylindrical stop button 281 threaded into one end of an elongated stop shaft 282 which has an enlarged cylindrical body portion 283 threading into a flanged nut 284 seated in a recess in a boss 285 projecting rearwardly and upwardly from the casing portion 156 of the work head. A cover plate 286 bolted to the top of the boss holds the nut against endwise movement. Rotation of the nut is prevented by a pin 287 engaging in a slot or aperture in the flange of the nut.

Rigidly secured on suitable locating pads 288 on the frame 262 as by clamping members 289 is a fixed stop in the form of a horizontal positioner bar 290 disposed in the path described by the stop button in the rocking movements of the work head. The positioner bar extends parallel to the reciprocatory path of the head and is of sufficient length to engage the stop button in any position of the work carriage along its guideway. The engagement of the stop button with the positioner bar, of course, limits the range of movement of the work head and thus determines the relative lateral position of the work with respect to the grinding wheel.

Fine adjustments in the position of the work are made by screwing the stop shaft 282 into or out of its associated nut. For this purpose the upper end of the shaft is extended through the cover plate 286 and to the projecting end is keyed a radially projecting handle 291 conveniently accessible from the front of the machine. The handle is formed with a depending shoulder portion 292 facing the peripheral wall of a cylindrical projection 293 on the plate 286. A hardened locking pin 294' slidably disposed in a passage extending from the shouldered portion of the handle and back through the outer end thereof is adapted to be shifted forwardly into frictional engagement with the projection 293 by rotation of a tubular gripping member 294 mounted on the end of the handle to lock the handle in set position. For this purpose a rod 295 is disposed axially within the gripping member and non-rotatably anchored thereto. This rod is threaded into the outer end of the passage for the pin 294'. Movements of the rod resulting from the rotation of the gripping member are transmitted to the locking pin by an intermediate pin 296.

To facilitate adjustment of the work head and insure accurate finishing of the work exactly to the desired dimension, a stop 297 is provided for limiting the range of movement of the handle 291. The stop as herein shown is adjustably secured in a T-slot 298 in the cover plate 286 and is arranged to project into the path of the shoulder portion 292 of the handle. At the beginning of an operating cycle, the handle may be swung around to retract the stop shaft and thus permit the head to swing through a maximum stroke. In this position of the head the grinding wheel will take a relatively shallow cut. The depth of cut may then be increased progressively by shifting the handle through a series of small steps after each pass of the work relative to the grinding wheel until the limit position defined by the stop 297 is reached.

Means is desirably provided for cushioning the shock incident to the engagement of the positioner bar by the stop button so as to reduce wear on the parts. The cushioning means as herein shown comprises a dash pot mechanism incorporated in the stop shaft 282. Referring to Fig. 12, the stop shaft is formed with a cylindrical, axially alined recess 300 in which a plunger 301 is slidably disposed. A hollow stem 302 projects from the lower end of the plunger through a suitable passage in the stop button. An annular packing ring 303 of leather or other suitable material is clamped to the inner end of the plunger by means of a headed bolt 304 threading into the hollow stem. The packing ring provides a sealing fit with the walls of the recess 300 thus enabling the plunger to compress the air entrapped in the inner end of the recess.

The entire plunger assembly is urged outwardly by a coiled compression spring 305 interposed between the head of the bolt 304 and the inner end of the recess 300 to project the stem of the plunger into the position shown in Fig. 8. An extension 306 of reduced diameter projecting rearwardly from the head of the bolt extends through the spring and acts as a guide for the same. In its projected position, the stem initially engages the positioner bar as the head swings toward operating position. The plunger assembly is accordingly forced inwardly to the limit position shown in Fig. 12.

The inward movement of the plunger 301 compresses the air entrapped in the inner end of the recess 300, the air escaping by way of a duct 307 extending through the bolt 304 and communicating with the inner end of the recess. A tapered plug 308 threaded into the hollow stem 302 acts to restrict the discharge opening for the air and thus regulates the rate at which the rearward movement of the plunger takes place. The plug is provided with longitudinal grooves 309 to permit the escape of air from the hollow stem. Upon movement of the work head to gauging position the plunger is projected outwardly while air enters the recess through the passage above described.

The stop shaft 282 may be also utilized to advantage for actuating the reversing switch RS which, as hereinbefore explained, controls the direction of rotation of the motor M1 and therefore the direction of movement of the work carriage. Actuation of the switch is effected by engagement of the shaft alternately with a pair of reversing dogs 310 and 311 (Figs. 10, 10a and 12) adjustably mounted in spaced relation on a switch actuating bar 312. The actuating bar is supported for endwise sliding movement on the frame 262 above and slightly to the rear of the positioner bar. Such movements of the bar are transmitted to the switch RS through an arm 313 fast on the bar and an actuator 314 projecting horizontally from the switch casing. A yieldable connection 315 is provided between the arm and the actuator to compensate for the different range of movements of these parts.

As shown in Fig. 10a, the reversing dog 310 is provided on its inner face with a pad 316 which is normally engageable by the stop shaft as the work head moves into retracted position. This pad is arranged so that it can be moved out of the path of the stop shaft when it is desired to increase the range of movement of the work head since the head will then move sufficiently to bring the stop shaft into direct engagement with the dog 310. To this end the pad is formed with a rearwardly projecting hub 317 journaled in an aperture in the dog. The end portion of the hub is formed with gear teeth 318 meshing with a gear 319 fast on a squared rod 320 extending generally parallel to the switch actuating bar 312 and journaled on the frame 262. Thus the pad can be swung to either its active or retracted positions by rocking the rod 320. A hand lever 321 (Figs. 5 and 8) is fixed to the end of the rod for rocking the same.

In setting up the machine for a particular class of work as for example, grinding internal screw threads previously rough machined in the workpiece W, the following initial adjustments or settings are made although not necessarily in the order mentioned. It is assumed of course, that a grinding wheel 23 of the proper grade and size has been mounted on the wheel head 24. If necessitated by the length of the spindle, the wheel assembly is adjusted axially in the friction mounting sleeve 62 so that the wheel is accurately located on the reference point P. The wheel head is then swiveled to accurately aline the wheel with the helix angle of the threads to be ground. Corresponding adjustments are made in the setting of the intermediate driving pulley 75 and the motor M.

The grinding wheel dresser having been adjusted in the usual manner in conformity with the form and pitch of the threads to be ground, the dresser slide is moved into an adjusted position with respect to the work by manipulation of the hand wheel 144. The position of the grinding wheel may then be roughly adjusted by means of the hand wheel 203 so that the dresser can operate to properly size and shape the wheel. These adjustments may be made with reference to a test work piece secured in place on the work spindle.

In case the feed screw and nut assembly 190 used for the previous job is unsuitable for the work for which the machine is being set up, this assembly is replaced by a suitable lead screw and nut assembly having a pitch corresponding to the pitch of the threads to be ground. In installing the new lead screw the spacers 193 may be appropriately arranged to located the screw member 191 so that the work piece may be retracted the desired distance from the grinding wheel. The range of feed movement is then determined by adjustment of the reversing dogs 310 and 311 on the switch actuating bar 312. Adjustment is also made for right or left hand threads as required by swinging the reversing gear bracket 182 into either its forward or reverse position.

With the machine thus set up the final sizing adjustment for depth of cut is made by turning the stop shaft 282 until the stop button 281 engages the positioner bar 290 so as to locate the work exactly in position for the wheel to make the finishing cut. The stop 297 is then set to prevent turning of the adjusting lever 291 beyond the set position.

In placing the machine in operation the wheel driving motor M and work driving mottor M1 are started in the usual manner by manipulation of the push buttons on the switch panel SP. Ordinarily the work will be given a series of passes relative to the wheel. Before the first pass is made, the stop shaft 282 is usually retracted to cause the wheel to make a cut of minimum depth. Thereafter, for each pass, the stop shaft may be advanced a small amount to progressively increase the depth of cut until the work is ground to final size as indicated by the engagement of the adjusting lever 291 with its cooperating stop 297.

After each pass of the work or after several passes it may be desirable to gauge the work size. This is done when the work carriage is in the retracted position at which time the operator, through the manual control lever 273, initiates the operation of the power mechanism for swinging the work head to its feed or gauging position. Manipulation of the control lever at any other time is rendered ineffective by the safety locking mechanism actuated by the safety dog 274. This dog of course, may be variably set as required for different classes of work.

It will be apparent from the foregoing, that the invention provides a thread grinding machine of novel and improved construction particularly adapted for grinding internal threads with a high degree of precision. The machine may be readily set up for operating on a wide variety of work and all adjustments required during the actual operating cycle are quickly and easily made by means of controls conveniently accessible at the front of the machine.

Through the novel relationship of the grinding wheel and dressing apparatus, accurate sizing of the work is very readily attained. Moreover, any back lash developing in the feed mechanism through wear or the like may be effectually neutralized. In general it is apparent that the invention provides a thread grinding machine particularly suitable for operation under production conditions and yet capable of finishing the work to a high degree of precision.

I claim as my invention:

1. A thread grinding machine having, in combination, a rotatably driven grinding wheel, a carriage reciprocable toward and from the grinding wheel, a feed shaft extending parallel to the reciprocatory path of the carriage, means for driving said shaft to impart feed and return movements to the carriage, a work head mounted on said carriage for pivotal movement about the axis of said shaft, a work supporting spindle journaled on said head, a gear fixed to the spindle, a gear fixed to the shaft, a bracket mounted for pivotal movement about the axis of said shaft, a driving gear journaled in said bracket and meshing with the gear on said shaft, an idler gear journaled on the bracket and meshing with said driving gear, and means for swinging said bracket on its pivot to engage either said driving gear or said idler gear selectively with the gear on said spindle.

2. A thread grinding machine having, in combination, a rotatably driven grinding wheel, a carriage reciprocable toward and from the grinding wheel, a feed shaft extending parallel to the reciprocatory path of the carriage, means for driving said shaft to impart feed and return movements to the carriage, a work head mounted on said carriage for pivotal movement about the axis of said shaft, a work supporting spindle journaled on said head, and means drivingly connecting said shaft with said spindle, said connecting means being adjustable to cause the spindle to rotate either in the same direction as the shaft or in the opposite direction.

3. A thread grinding machine having, in combination, a rotatably driven grinding wheel, a carriage reciprocable toward and from the grinding wheel, a feed shaft extending parallel to the reciprocatory path of the carriage, means for driving said shaft to impart feed and return movements to the carriage, a work head mounted on said carriage for pivotal movement about the axis of said shaft, a work supporting spindle journaled on said head, and driving means connecting said shaft and said spindle for rotating the spindle in timed relation to the feed of the carriage.

4. A thread grinding machine having, in combination, a rotatably driven grinding wheel, means supporting work to be operated on by said wheel comprising a carriage reciprocable toward and from the grinding wheel, a work head pivoted on said carriage to swing transversely of the reciprocatory path of the carriage between an operating position in which the work is engageable by the grinding wheel and an inactive position in which the head is conveniently accessible for loading and gauging the work, a power driven reciprocatory member, a bell crank adapted to be rocked by said member in its reciprocation, and a link connecting said bell crank with said head operative in the rocking of said bell crank to swing the head between its operating and loading positions.

5. In a machine of the class described, the combination of a reciprocable carriage, a feed shaft journaled on said carriage and reciprocable therewith, a lead screw keyed to the shaft, a stationary nut coacting with said lead screw, means for driving the shaft to impart feed and return movements to the carriage, said driving means including a driven shaft extending generally parallel to said feed shaft, pulleys nonrotatably secured to the respective shafts, an endless flexible driving member running over said pulleys and means for shifting the pulley on said drive shaft longitudinally thereof in synchronism with the movements of the carriage to maintain the pulleys in alinement.

6. In a thread grinding machine, in combination, a rotatably driven grinding wheel, a reciprocable work support, feed mechanism for advancing the work support to feed the work to the wheel, said feed mechanism including interengageable rotatable lead screw and relatively stationary nut members, power actuated means for driving said screw member, a control member movable to turn said nut for taking up the back lash in the feed mechanism, adjustable stops for limiting movement of said member to a predetermined range, and a second control member normally movable with said first control member, but disengageable therefrom for independent movement, said second control member acting to rotate said nut to effect a predetermined adjustment of the work relative to the grinding wheel.

7. In a thread grinding machine, in combination, a rotatably driven grinding wheel, a reciprocable work support, feed mechanism for advancing the work support to feed the work to the grinding wheel, said feed mechanism including interengageable rotatable lead screw and relatively stationary nut members, power actuated means for driving said screw member, a control member operable to rotate said nut for effecting a predetermined adjustment of the work relative to the grinding wheel, a second control member operable to rotate said nut to take up back lash in the feed mechanism, and means for locking said control members together.

8. In a thread grinding machine, in combination, a rotatably driven grinding wheel, a reciprocable work support, feed mechanism for advancing the work support to feed the work to and from the grinding wheel, said feed mechanism including interengageable rotatable lead screw and relatively stationary nut members, power actuated means for driving said screw member, control means for rotating said nut to effect a predetermined adjustment of the work and grinding wheel, other control means for rotating said nut to compensate for back lash in the feed mechanism, and adjustable stop means coacting with said last mentioned control means for limiting the degree of rotation imparted to said nut.

9. A thread grinding machine having, in combination, a rotatably driven grinding wheel, a work supporting carriage, feed mechanism for advancing the carriage to feed the work to the grinding wheel, said mechanism including a power driven shaft, a stationarily supported nut, a lead screw keyed to said shaft and engageable with said nut, and a series of spacers on said shaft for holding the lead screw against movement axially of the shaft, said spacers being interchangeable to accommodate lead screws of different lengths.

10. A thread grinding machine having, in combination, a rotatably driven grinding wheel, a work supporting carriage, feed mechanism for advancing the carriage to feed the work to the grinding wheel, said mechanism including a power driven shaft, a stationarily supported nut, a tubular member keyed to said shaft having lead screw threads engageable with said nut, and means adjustable to variably position said member axially of the shaft to variably locate the work with respect to the grinding wheel.

11. In a grinding machine, in combination, a base, a work slide reciprocably mounted thereon, means on said slide for rotatably supporting a work piece for movement therewith in a direction axial of the work piece, a primary slide mounted for movement transversely of said work slide, a wheel slide mounted on said primary slide for movement transversely of the work slide, a dresser slide mounted on said primary slide at one side of said wheel slide for movement in a path generally parallel to the path of the wheel slide, stop means for determining the limit position of the dresser slide, control means operable to move said stop means to a position of adjustment with respect to the work, and other control means for moving said wheel slide into a position of adjustment with respect to said dresser slide.

12. In a machine for grinding tapered screw threads, in combination, a base, a work slide reciprocably mounted thereon, means for rotatably supporting a work piece on said slide for axial traverse therewith, a primary slide supported for reciprocation transversely of said work slide, a secondary slide supported on said primary slide for movement therewith and for independent movement relative thereto, a rotatably driven grinding wheel mounted on said secondary slide, feed mechanism for advancing the work slide to feed the work piece to the grinding wheel at a predetermined rate, control means operable to position said secondary slide for determining the depth of cut taken by the grinding wheel, and means operable by said work slide in its feed movement for shifting said primary and secondary slides together to determine the taper to be ground on the work piece.

13. In a thread grinding machine having a rotatably driven grinding wheel, a combination of a support for work to be operated on by the wheel, feed mechanism for effecting relative reciprocation between the work support and the grinding wheel, said mechanism including interengaging lead screw and nut members, power actuated means for driving said lead screw, a rotatable frame supporting said nut, a first control member manually operable to rotate said frame and thereby effect a predetermined adjustment of the work and the grinding wheel, a second control member adapted to be disengageably latched to said first control member, and means carried by said second control member for limiting the rotational movement of said frame to a range effective to take up back lash in the feed mechanism.

14. A thread grinding machine having, in combination, a base, relatively shiftable work and grinding wheel supports on said base, a feed shaft associated with one of said supports and shiftable therewith, means for driving said feed shaft including a power driven shaft journaled on the base and extending generally parallel to said feed shaft, a member drivingly coupled with the power driven shaft and slidable axially thereof, a flexible driving element connecting said member with the feed shaft to drive the same, means for shifting said member in timed relation to the movements of said one support to maintain a predetermined relationship between the member and the feed shaft, and means for adjusting the relative spacing of said two shafts to regulate the tension of said flexible driving element.

15. A thread grinding machine having, in combination, a rotatably driven grinding wheel, a translatable work carriage operable to traverse a workpiece relative to the grinding wheel, said carriage comprising a front slide, a rear slide, a work head pivotally supported between said slides to swing transversely of the reciprocatory path of the slides between operating and loading positions, a work supporting spindle journaled in said head, a power driven shaft rotatably anchored in one slide operable to translate the carriage, and means drivingly connecting said shaft with said spindle to effect rotation of the spindle in timed relation to the translation of the carriage.

16. A thread grinding machine having, in combination, a base, a rotatably driven grinding wheel adjustably carried on said base, a work supporting carriage translatable on said base to traverse a workpiece relative to the grinding wheel, said carriage comprising a slide, a work head extending above said slide and pivotally supported thereon to oscillate transversely of the path of the slide, power actuated means for swinging said head through a substantial arc between an operating position in which the work is alined with the grinding wheel and a loading position in which the work is conveniently accessible from the front of the machine, said power actuated means including a pressure fluid operated actuator stationarily supported on the machine base, a linkage interposed between said actuator and said head, said linkage having a slidable connection with the head to permit reciprocation of the same while the actuator remains stationary, and adjustable stop means for limiting the extent of movement of the head in one direction.

17. A thread grinding machine having, in combination, a base, a rotatively driven grinding wheel mounted on the base, a carriage supported on the base for reciprocation relative to said wheel, feed mechanism for translating the carriage, a head pivotally mounted on said carriage to swing transversely of the reciprocatory path thereof between an operating position and a loading position, a work supporting spindle journaled in said head, means for driving said spindle and said feed mechanism including a member supported on said carriage for rotation about an axis coincident with the pivotal axis of said head, power actuated means on the base arranged to drive said member, and means drivingly connecting said member with said feed mechanism and said spindle.

18. A thread grinding machine having, in combination, a base, a rotatively driven grinding wheel mounted on the base, a carriage supported on the base for reciprocation relative to said wheel, feed mechanism for translating the carriage, a head pivotally mounted on said carriage to swing transversely of the reciprocatory path thereof between an operating position and a loading position, a work supporting spindle journaled in said head, means for driving said spindle and said feed mechanism including a power driven pulley journaled on the base, a second pulley journaled on said carriage for rotation about an axis coincident with the pivotal axis of said head, a flexible driving member connecting said pulleys, and means drivingly connecting said second pulley with said spindle and said feed mechanism.

19. A thread grinding machine having, in combination, a rotatably driven grinding wheel, a carriage translatable relative to said wheel, a work supporting head pivoted on said carriage to swing transversely of the path of movement of the carriage between an operating position and a loading position, power actuated means operative to translate the carriage, means for adjusting the operating position of said head to regulate the depth of cut taken by the grinding wheel, said adjusting means comprising, a fixed stop disposed at one side of the head and extending generally parallel to the path of translation of the carriage, a shaft threaded into the head and having a member at one end positioned to engage said stop upon movement of the head toward the operating position, a hand lever fixed to said shaft and accessible from the front of the machine operable to rotate said shaft and thereby vary the position of the stop engaging member with respect to the head, adjustable means effective to confine the movements of said hand lever within predetermined limits, and means operable to lock the hand lever in any selected position within said predetermined limits.

20. A thread grinding machine having, in combination, a rotatably driven grinding wheel, a carriage translatable with respect to said wheel, a work supporting head pivotally mounted on said carriage to swing transversely of the path of the carriage between an operating position and a loading position, power actuated means operative to translate the carriage for feeding the work to and from the grinding wheel, control means operable to adjust the operating position of the head so as to regulate the depth of cut taken by the grinding wheel, said control means comprising, a fixed stop disposed at one side of the head, a member adjustably mounted on the head and arranged to engage said stop upon movement of the head toward the operating position, a hand lever fixed to said member and accessible from the front of the machine for adjusting the position of said stop engaging member with respect to the head, and adjustable means for limiting the range of movement of said hand lever.

21. A thread grinding machine having, in combination, a rotatably driven grinding wheel, a carriage supported for reciprocation relative to said wheel, a work supporting head pivoted on said carriage to swing transversely of the reciprocatory path thereof between operating and loading positions, power actuated means for imparting feed and return movements to the carriage to traverse a workpiece relative to the grinding wheel, a fixed stop disposed at one side of the head, a member supported on said head for engagement with said stop to limit the movement of the head toward the operating position, a plunger slidably mounted in said member, and means yieldably urging said plunger into a position to contact said stop before engagement therewith by said member, said plunger acting to cushion the shock of the engagement of the member with the stop and thereafter withdrawing to allow the member to accurately position the head.

IRA J. SNADER.